US007808607B2

United States Patent
Lee et al.

(10) Patent No.: US 7,808,607 B2
(45) Date of Patent: Oct. 5, 2010

(54) LIQUID CRYSTAL DISPLAY DEVICE AND METHOD OF FABRICATING THE SAME

(75) Inventors: Joon Suk Lee, Seoul (KR); Young Seung Jee, Gyeonggi-do (KR); Jeong Oh Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/503,667

(22) Filed: Jul. 15, 2009

(65) Prior Publication Data
US 2009/0275256 A1 Nov. 5, 2009

Related U.S. Application Data

(62) Division of application No. 11/372,082, filed on Mar. 10, 2006, now Pat. No. 7,576,827.

(30) Foreign Application Priority Data
Sep. 28, 2005 (KR) .................. 10-2005-0090417

(51) Int. Cl.
*G02F 1/13* (2006.01)

(52) U.S. Cl. .............. 349/187; 349/155; 349/156; 349/110

(58) Field of Classification Search ............... 349/155, 349/156, 110, 106, 187, 189, 190; 445/25; 438/30
See application file for complete search history.

(56) References Cited

U.S. PATENT DOCUMENTS 5,917,572 A * 6/1999 Kurauchi et al. ............. 349/156

* cited by examiner

*Primary Examiner*—Thoi V Duong
(74) *Attorney, Agent, or Firm*—Morgan Lewis & Bockius LLP

(57) ABSTRACT

A liquid crystal display device includes: a first substrate having a plurality of gate lines and a plurality of data lines crossing each other; a second substrate facing the first substrate; a first pattern spacer having an inverse tapered shape on an inner surface of the first substrate; a second pattern spacer having an inverse tapered shape on an inner surface of the second substrate; a seal pattern on a peripheral edge of the first and second substrates; and a liquid crystal layer between the first and second substrates.

8 Claims, 3 Drawing Sheets

LIQUID CRYSTAL DISPLAY DEVICE AND METHOD OF FABRICATING THE SAME

The application is a divisional of U.S. patent application Ser. No. 11/372,082 filed on Mar. 10, 2006 and claims the benefit of Korean Patent Application No. 2005-0090417, filed on Sep. 28, 2005, both of which are hereby incorporated by reference in their entirety.

BACKGROUND OF THE INVENTION

1. Field of the Invention

The present invention relates to a display device, and more particularly, to a liquid crystal display device and a method of fabricating the same.

2. Description of the Related Art

The liquid crystal display (LCD) device has been most favored recently as an efficient and value-added next generation display device, due to its low power consumption and its portability. In general, the LCD includes a lower substrate and an upper substrate arranged facing the lower substrate with a liquid crystal layer interposed between the lower substrate and the upper substrate. The lower substrate has a thin film transistor and a pixel electrode formed thereon. The upper substrate has a black matrix layer, a color filter layer and a common electrode formed thereon. The lower and upper substrates maintain a constant cell gap using a spacer. In such an LCD, an electric field is formed between the lower and upper substrates by a pixel electrode and a common electrode to align liquid crystal molecules, and light transmittance is adjusted through the alignment of the liquid crystal molecules to thereby display images. The picture quality of an LCD device is influenced by the integrity of the liquid crystal layer interposed between the two substrates. For instance, if the liquid crystal material is over-filled or expands due to high temperature, gravity failure may occur.

FIG. 1 is a cross-sectional view of the related art LCD showing a gravity failure. As shown in FIG. 1, the related art LCD includes a lower substrate 10, an upper substrate 20, and a liquid crystal layer 40 interposed between the lower substrate 10 and the upper substrate 20. The lower substrate 10 has a thin film transistor (Tr) formed thereon. The upper substrate 20 has a color filter layer 21 and a black matrix layer 22 formed thereon. The lower substrate 10 and the upper substrate 20 are attached by a seal pattern 30. The lower and upper substrates 10 and 20 maintain a constant cell gap using pattern spacers 50. The liquid crystal layer 40 is formed by injecting a liquid crystal material into an inner space between the lower and upper substrates 10 and 20 defined by the pattern spacers 50.

A proper amount of the liquid crystal material should be injected into the inner space. However, it is difficult to control the injection amount of the liquid crystal material. Sometimes, the liquid crystal material may over-fill the inner space, which can result in a gravity failure. Over-filling can cause other problems. For example, when the temperature of the liquid crystal material is increased due to an external environment, the volume of the liquid crystal expands to become larger than the inner space. If such an expansion occurs, the pattern spacers 50 are detached from one of the two substrates such that a liquid crystal path 'A' may be generated. Through the liquid crystal path 'A', the liquid crystal is collected downward, so that the cell gap becomes non-uniform. The non-uniform cell gap deteriorates the quality of the LCD and may cause a touch failure. Gravity failure and the touch brightness failure become exacerbated as the screen size of the LCD increases.

SUMMARY OF THE INVENTION

Accordingly, the present invention is directed to a liquid crystal display and a method of fabricating the same that substantially obviate one or more problems due to limitations and disadvantages of the related art.

An object of the present invention is to provide a liquid crystal display and a method of fabricating the same for preventing touch brightness failure in an LCD panel.

Another object of the present invention is to provide a liquid crystal display and a method of fabricating the same for preventing gravity failure in an LCD panel.

An object of the present invention is to provide a liquid crystal display and a method of fabricating the same to maintain the cell gap an LCD panel.

Additional advantages, objects, and features of the invention will be set forth in part in the description which follows and in part will become apparent to those having ordinary skill in the art upon examination of the following or may be learned from practice of the invention. The objectives and other advantages of the invention can be realized and attained by the structure particularly pointed out in the written description and claims hereof as well as the appended drawings.

To achieve these objects and other advantages and in accordance with the purpose of the invention, as embodied and broadly described herein, there is provided a liquid crystal display device including: a first substrate having a plurality of gate lines and a plurality of data lines crossing each other; a second substrate facing the first substrate; a first pattern spacer having an inverse tapered shape on an inner surface of the first substrate; a second pattern spacer having an inverse tapered shape on an inner surface of the second substrate; a seal pattern on a peripheral edge of the first and second substrates; and a liquid crystal layer between the first and second substrates, wherein the first and second pattern spacers have a tapered shape.

In another aspect, a liquid crystal display device includes: a first substrate having a plurality of gate lines and a plurality of data lines crossing each other; a second substrate facing the first substrate; a first pattern spacer having an inverse tapered shape on an inner surface of the first substrate; a second pattern spacer having an inverse tapered shape on an inner surface of the second substrate; a seal pattern on a peripheral edge of the first and second substrates; and a liquid crystal layer between the first and second substrates, wherein the first and second pattern spacers are interleaved.

In another aspect, there is provided a method of fabricating a liquid crystal display device that includes providing a first substrate having a thin film transistor formed on a unit pixel region defined by a plurality of gate lines crossing a plurality of data lines, forming a passivation layer having a contact hole exposing a drain electrode of the thin film transistor, forming a pixel electrode connected with the drain electrode through the contact hole, forming a photoresist film on the passivation layer, and exposing and developing the photoresist film to form a first pattern spacer having a tapered shape.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE PREFERRED EMBODIMENTS

Figure 1:
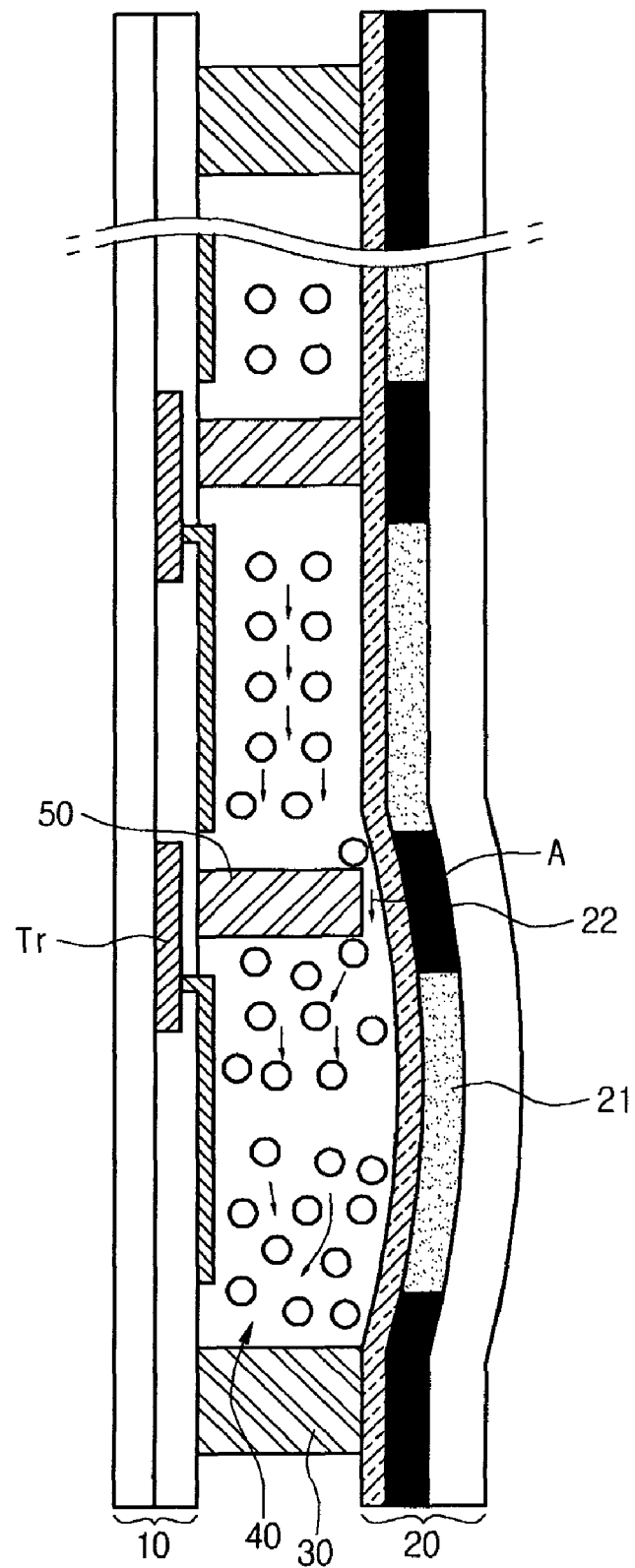
FIG. 1 is a cross-sectional view of a related art LCD showing a gravity failure.

Reference will now be made in detail to the preferred embodiments of the present invention, examples of which are illustrated in the accompanying drawings. The invention can, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity. Like reference numerals in the drawings denote like elements.

Figure 2:
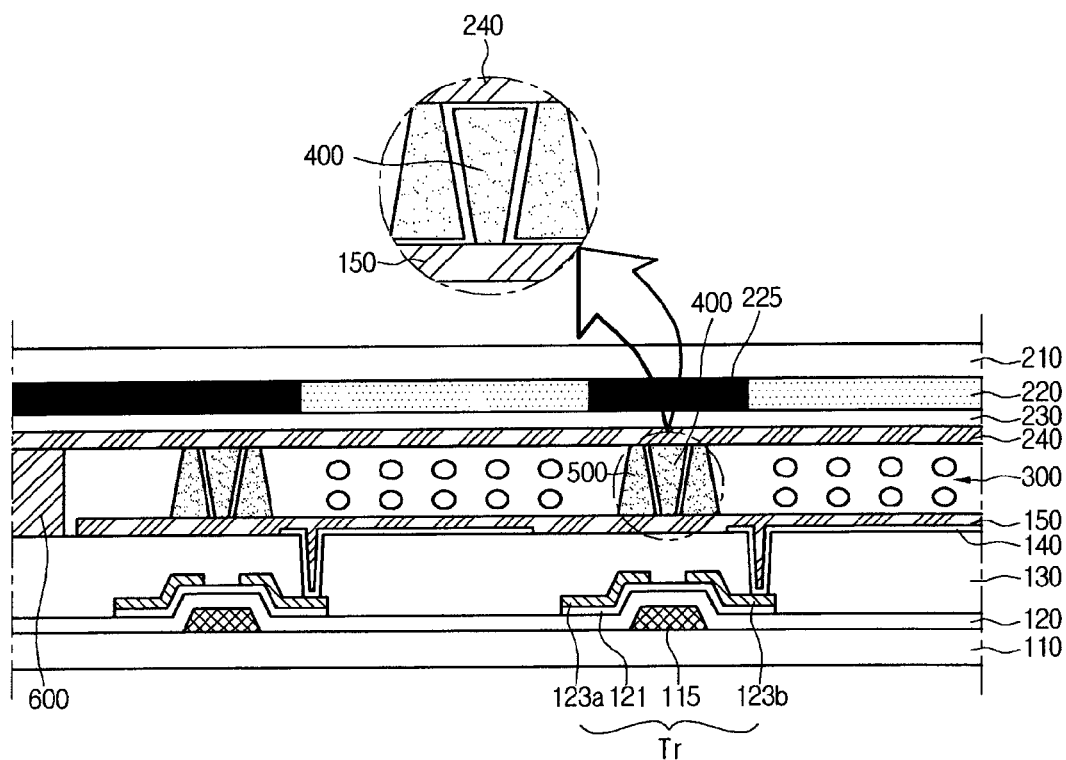
FIG. 2 is a cross-sectional view of an LCD according to an embodiment of the present invention.

FIG. 2 is a cross-sectional view of an LCD according to an embodiment of the present invention. As shown in FIG. 2, the LCD includes a first substrate 110, a second substrate 210, and a liquid crystal layer interposed between the first and second substrates 110 and 210. The first substrate 110 has thin film transistors (Tr) and a first pattern spacer 400 formed thereon. The second substrate 210 has a color filter layer 220 and a second pattern spacer 500 formed thereon. The first and second substrates 110 and 210 are attached to each other by a seal pattern 600 formed on a peripheral edge of the two substrates for maintaining a constant cell gap.

The first pattern spacer 400 and the second pattern spacer 500 have inverse tapered shapes that complement each other. More particularly, an inverse tapered shape has a bottom surface area contacting the substrate that is smaller than an opposite top surface area. The first pattern spacer 400 and the second pattern spacer 500 are disposed to be interlocked with each other. In other words, the second pattern spacer 500 can be inserted between the first pattern spacers 400. In an alternative, the first pattern spacer 400 can be inserted between the second 6 pattern spacers 500. Such an interlocked structure prevents a liquid crystal path from forming between regions, and the first and second substrates 110 and 210 from separating from each other.

Referring to FIG. 2, a plurality of gate lines (not shown) and a plurality of data lines (not shown) are arranged crossing each other on the first substrate 110, and a thin film transistor (Tr) is disposed adjacent to a crossing of the gate line and the data line within each unit pixel. Over the entire surface of the first substrate 110 including the thin film transistor (Tr), a passivation layer 130 is disposed. The passivation layer 130 is an inorganic insulation material, such as silicon nitride or silicon oxide. Herein, the passivation layer 130 is provided with a contact hole exposing a drain electrode of the thin film transistor (Tr).

A pixel electrode 140 is positioned on the passivation layer 130 and is connected with the drain electrode through the contact hole. A first alignment film 240 is positioned on the pixel electrode 140. The first alignment film 240 functions to align the liquid crystal molecules of the liquid crystal layer 300 in a selected direction. The first pattern spacer 400 can be positioned on the first alignment layer 240 corresponding to a non-transmission region of the first substrate 110, such as a region where the thin film transistor, a capacitor or a plurality of interconnection lines are formed. This is because the first pattern spacer 400 affects the light transmittance.

The first pattern spacer 400 can be made of an organic insulation material, such as a negative photoresist material. The organic insulation material can be a Novalac phororesist resin. The first pattern spacer 400 can have an inverse tapered shape. Unlike in the drawing, the first pattern spacer 400 can be formed as a plurality of spacers. Thereafter, the first pattern spacers 500 can be inserted between the second pattern spacers 500 to enhance an adhesive force between the first substrate 110 and the second substrate 210.

Meanwhile, the second substrate 210 is disposed facing the first substrate 110. The second substrate 210 includes a black matrix layer 225 formed on a region corresponding to a non-transmission region where the thin film transistor (Tr) is formed, and a color filter layer 220 formed on a region corresponding to a transmission region to express colors. A transparent upper electrode 230 serving as a common electrode is formed on the black matrix layer 225 and the color filter layer 220, and a second alignment layer 240 is positioned below the upper transparent electrode 230.

The second pattern spacer 500 is positioned on a region corresponding to the non-transmission region on the second alignment layer 240, i.e., on a region where the black matrix layer 225 is formed. The second pattern spacer 500 can have an inverse tapered shape. Unlike in the drawing, the second pattern spacer 500 is formed in plurality. This is because the first pattern spacers 400 are interlocked between the second pattern spacers 500 such that the second pattern spacers 500 are not separated from the first substrate 110. The second pattern spacer 500 can be made of an organic insulation material, such as a negative photoresist material. Alternatively, the second pattern spacer 500 can be formed of a Novalac photoresist resin.

The liquid crystal layer 300 interposed between the first substrate 110 and the second substrate 210 can be a liquid crystal material, such as twisted nematic (TN), super twisted nematic (STN), electrically controlled birefringence (ECB), optically compensated birefringence (OCB), hybrid aligned nematic (HAN) and vertical alignment (VA) modes.

Figure 3A:
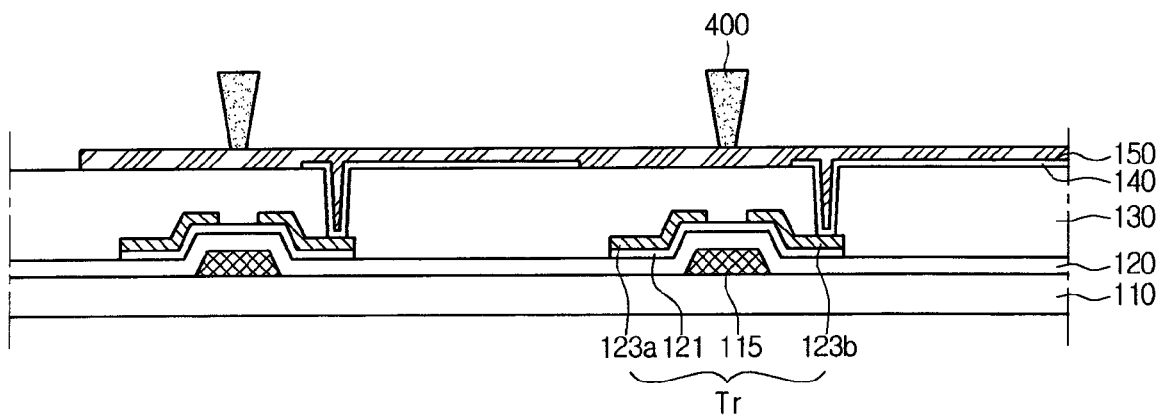
FIGS. 3A through 3D are cross-sectional views illustrating a method of fabricating an LCD according to an embodiment of the present invention.

FIGS. 3A through 3D are cross-sectional views illustrating a method of fabricating an LCD according to an embodiment of the present invention. Referring to FIG. 3A, a first substrate 110 is first provided. The first substrate 110 can be a plastic substrate or a glass substrate. A plurality of gate lines and a plurality of data lines perpendicularly cross each other to define a pixel region on the first substrate 110, and thin film transistors (Tr) are also formed adjacent to the crossings of the pluralities of gate lines and data lines.

Each of the thin film transistors (Tr) is formed by the following process operations. First, a first conductive layer is formed on the first substrate and is then patterned to form a gate electrode 115. The first conductive layer can be made of a low resistance conductive material, such as, Al, Mo, Cu or an alloy thereof. Thereafter, a gate insulation layer 120 is formed on the entire surface of the first substrate 110, including the gate electrode 115. The gate insulation layer 120 can be silicon nitride or silicon oxide formed by chemical vapor deposition (CVD). A silicon layer and a doped amorphous silicon layer are sequentially deposited and are then patterned to form an active layer 121. Thereafter, a second conductive layer is deposited on the first substrate 110, including the active layer 121, and is then patterned to form a source/drain electrode 123a/123b. The second conductive layer can be formed of Mo, Cr, Al or an alloy thereof.

Through the above process operations, a thin film transistor (Tr) having the gate electrode 115, the active layer 121 and the source/drain electrode 123a/123b is formed on the first substrate 110. Thereafter, a passivation layer 130 is formed on the entire surface of the first substrate 110, including the thin film transistor (Tr). The passivation layer 130 is an inorganic insulation layer, such as silicon nitride or silicon oxide.

A contact hole exposing the drain electrode 123b is formed in the passivation layer 130. Thereafter, a transparent conductive layer is formed on the passivation layer 130 and is then patterned to form a pixel electrode 140. The pixel electrode 140 can be made of indium tin oxide (ITO), indium zinc oxide (IZO) or indium tin zinc oxide (ITZO). Although not shown in the drawings, a first alignment layer is then formed on the first substrate 110, including the pixel electrode 140. The alignment layer 150 can be formed by coating one selected from the group consisting of polyamide, polyimide compound, a polyvinyl alcohol and a polyamic acid. Then, a surface of the coated film is rubbed. Alternatively, the alignment layer 150 can be formed by coating one of polyvinyl cinnamate, polysiloxane cinnamate and cellulose cinnamate compounds, which is then subjected to photo-rubbing.

A negative photoresist material is coated on the first alignment layer 150 to form a photoresist film. The photoresist film is exposed to light and developed to form a first pattern spacer 400. The negative photoresist material can be a Novalac photoresist resin. The first pattern spacer 400 can have an inverse tapered shape due to the exposure development characteristics of the photoresist material. The first pattern spacer 400 is formed on a region of the first substrate 110 where one of the thin film transistor Tr, a capacitor and the pluralities of gate and data lines is formed.

Figure 3B:
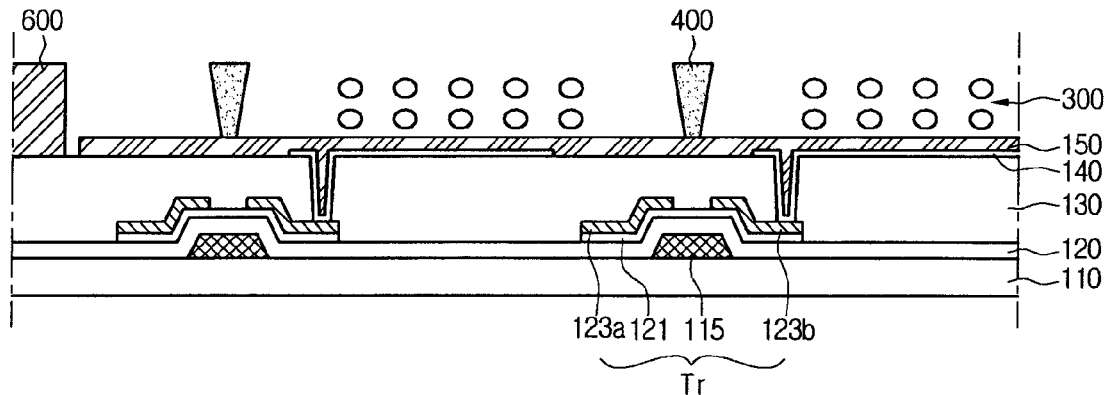

Referring to FIG. 3B, a seal pattern 600 is formed on a peripheral edge of the first substrate 110, and a liquid crystal is dropped on the first substrate 110 to form a liquid crystal layer 300. The seal pattern 600 can be made of an ultraviolet (UV)-curing sealant rather than a thermal curing sealant. A thermal-curing sealant may contaminate the liquid crystal material.

Figure 3C:
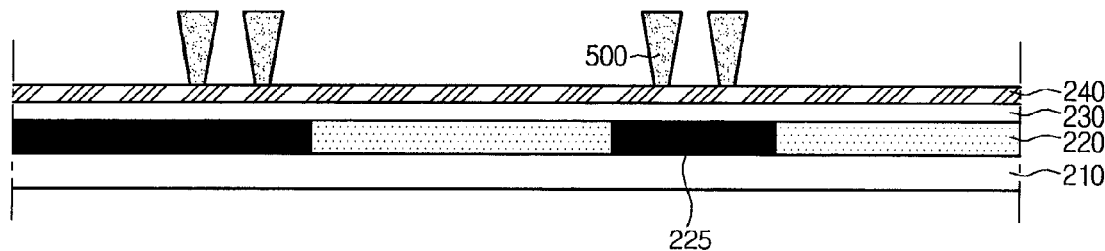

Referring to FIG. 3C, a second substrate 210 can be a plastic substrate or a glass substrate. Next a black matrix layer 225 is formed. The black matrix layer 225 shields light from being leaked in the region where a plurality of interconnection lines and thin film transistors are formed. Thereafter, a color filter layer 230 having red (R), green (G) and blue (B) color filter elements is formed thereon. Thereafter, a transparent conductive layer is deposited on the second substrate 210, including the color filter layer 230 and the black matrix layer 225, and is then patterned to form an upper electrode 230. At this time, as aforementioned, a second alignment layer 240 can be further formed on the upper electrode 240.

A negative photoresist material is coated on the second alignment layer 240, and is exposed to light and developed to form a second pattern spacer 500. The second pattern spacer 500 is preferably formed to have a plurality of inverse tapered shape spacers. Because of the availability of space on the black matrix layer 225, or alternatively, above the black matrix layer 225 on the alignment layer 240, more second pattern spacers 500 are formed on the second substrate 210 than first pattern spacers 400 formed on the first substrate 110. As aforementioned, to form the second pattern spacer 500 in the inverse tapered shape, the second pattern spacer 500 is formed of a negative photoresist material. For example, the second pattern spacer 500 can be a Novalac photoresist resin.

Figure 3D:
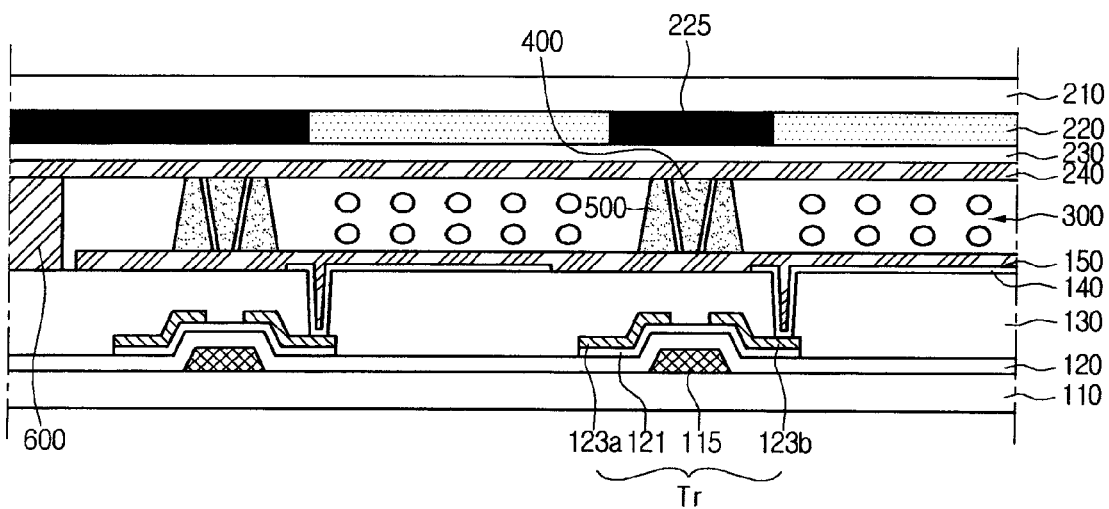

Referring to FIG. 3D, the first substrate 110 and the second substrate 210 are positioned such that a vacuum state can occur between the first and second substrates 110 and 210.

The first pattern spacer 400 and the second pattern spacer 500 are interlocked with each other by the pressure difference created by the vacuum. In other words, the second pattern spacer 500 can be inserted between the first pattern spacers 400 or the first pattern spacer can be inserted between the second pattern spacers 500. Then, UV is irradiated onto the seal pattern 600 such that the first and second substrates 110 and 210 are attached. The liquid crystal layer 300 is then formed by an injection method using a subsequent vacuum. The LCD panel is sealed, thereby completing an LCD panel.

The above embodiment describes interlocking the first pattern spacer 400 and the second pattern spacer 500 with a vacuum, the first pattern spacer 400 and the second pattern spacer 500 can alternatively be interlocked by sliding the patterns into each other. For example, one of the substrates is held in a fixed position while the other substrate is applied to the one substrate in a slightly offset manner and then the other substrate is slid so as to have the first and second pattern spacers interlock. Prior to sliding and interlocking the first and second pattern spacers, liquid crystal can be dropped on the one substrate to form the liquid crystal layer 300, which has a seal about the periphery of the substrate. Alternatively, the liquid crystal layer 300 is formed by a vacuum injection method after the substrates are attached by the interlocking first and second pattern spacers. Then, the LCD panel is sealed, thereby completing an LCD panel.

The first pattern spacer 400 formed on the first substrate 110 is interlocked with the second pattern spacer 500 formed on the second pattern spacer 210 or vice versa such that the first and second substrates 110 and 210 are not easily separated. Thus, the interlocking first and second pattern spacers prevent bulging of the LCD panel. Further, the interlocking first and second pattern spacers prevent a liquid crystal material path between regions of the LCD panel. Consequently, a good quality LCD can be fabricated.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of fabricating a liquid crystal display device, the method comprising:

providing a first substrate having a thin film transistor formed on a unit pixel region defined by a plurality of gate lines crossing a plurality of data lines;

exposing and developing a first photoresist film to form a plurality of first pattern spacers having an inverse tapered shape on the first substrate;

providing a second substrate having a black matrix layer and a color filter layer;

exposing and developing a second photoresist film to form a plurality of second pattern spacers having an inverse tapered shape on the second substrate; and attaching the first and second substrates, wherein the first and second pattern spacers are alternately disposed each other.

2. The method according to claim 1, further comprising:

positioning the second substrate above the first substrate; and interlocking the first and second pattern spacers using a vacuum between the first and second substrates.

3. The method according to claim 1, further comprising:
positioning the second substrate above and slightly offset from the first substrate; and
interlocking the first and second pattern spacers by sliding the second substrate.

4. The method according to claim 1, wherein the photoresist film is made of a negative photoresist material.

5. The method according to claim 1, further comprising:
forming a seal pattern on a peripheral edge of the first substrate;
dropping a liquid crystal material on the first substrate to form a liquid crystal layer;
positioning the second substrate above and slightly offset from the first substrate; and
interlocking the first and second pattern spacers by sliding one of the first and second substrates.

6. The method according to claim 1, further comprising:
forming a seal pattern on a peripheral edge of the first substrate;
positioning the second substrate above and slightly offset from the first substrate;
interlocking the first and second pattern spacers by sliding one of the first and second substrates; and
injecting liquid crystal to form a liquid crystal layer.

7. The method according to claim 1, further comprising:
forming a seal pattern on a peripheral edge of the first substrate;
providing the second substrate above the first substrate, the second substrate including the plurality of second pattern spacers formed thereon and having an inverse tapered shape;
interlocking the first and second pattern spacers using a vacuum between the first and second substrates;
curing the seal pattern; and
injecting liquid crystal to form a liquid crystal layer.

8. The method according to claim 1, wherein the providing a second substrate above the first substrate comprises:
forming an upper electrode on the black matrix layer and the color filter layer;
forming a photoresist film on the upper electrode; and
exposing and developing the photoresist film to form the second pattern spacers having an inverse tapered shape.

* * * * *